(12) United States Patent
Wang et al.

(10) Patent No.: US 10,725,712 B2
(45) Date of Patent: Jul. 28, 2020

(54) SYSTEM FOR PRINTING A DOCUMENT USING A PRINTER DRIVER BASED ON PAGE SIZE VALUE

(71) Applicant: Kyocera Document Solutions Inc., Osaka (JP)

(72) Inventors: Hui Wang, Temple City, CA (US); Dilinur Wushour, Clayton, CA (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 16/197,866

(22) Filed: Nov. 21, 2018

(65) Prior Publication Data
US 2020/0159474 A1    May 21, 2020

(51) Int. Cl.
*G06F 3/12* (2006.01)

(52) U.S. Cl.
CPC ............ *G06F 3/1212* (2013.01); *G06F 3/125* (2013.01); *G06F 3/1206* (2013.01); *G06F 3/1276* (2013.01); *G06F 3/1285* (2013.01)

(58) Field of Classification Search
None
See application file for complete search history.

(56) References Cited

U.S. PATENT DOCUMENTS

| | | | |
|---|---|---|---|
| 6,982,811 B2 | 1/2006 | Sato | |
| 8,891,115 B2 | 11/2014 | Sweet et al. | |
| 2001/0016859 A1 | 8/2001 | Sekido et al. | |
| 2009/0086237 A1* | 4/2009 | Hamaguchi | G06F 3/1204 358/1.13 |
| 2010/0103444 A1* | 4/2010 | Farrell | G06F 3/1205 358/1.15 |

* cited by examiner

*Primary Examiner* — Andrew H Lam
(74) *Attorney, Agent, or Firm* — Millen, White, Zelano & Branigan, P.C.; William Nixon (57) ABSTRACT

A printing device receives a document to print directly from a computing device. The document is converted into a portable document format (PDF) file. The PDF converter separates the document into different groups that are processed separate to generate multiple PDF files for the document. The PDF files include a first page file and subsequent files for groups of pages separated according to criteria, such as page number or size. The separate PDF file is sent to the PDF interpreter to be printed without waiting for the subsequent data within the document.

12 Claims, 8 Drawing Sheets

SYSTEM FOR PRINTING A DOCUMENT USING A PRINTER DRIVER BASED ON PAGE SIZE VALUE

FIELD OF THE INVENTION

The present invention relates to a system and associated methods for printing a document converted into a portable document format at a printing device. More particularly, the present invention provides efficient methods to print a document on a printer by generating a plurality of portable document format files.

DESCRIPTION OF THE RELATED ART

In some printers, document files having specific formats corresponding to word processing or document generation applications may not be directly printed. In these instances, the documents may require dedicated application software and printer drivers. Direct document printing, however, is growing in popularity in the printing industry. Document format conversion tools are needed to pre-convert a format of a document to a printer supported document format. Even in this environment, high speed document printing is expected.

For portable document format (PDF) printers, certain documents, such as those created with Microsoft Office™, are converted to the PDF format prior to printing. Regular PDF document format is not linearized. Instead, it requires a printer to wait for processing, for example, the first page until all file data has been received. The interpreting information is located at the end of the PDF file for the document. Printing performance becomes an issue in these circumstances, especially for long documents with hundreds of pages.

SUMMARY OF THE INVENTION

A method for printing a document having a PDF format from a computing device to a printing device over a network is disclosed. The computing device executes a software application. The method includes receiving a document created by the software application at a printer driver executing on the computing device. The method also includes converting a first page of the document to the PDF format by the printer driver. The method also includes generating a first PDF file for the first page. The method also includes converting a first group of pages of the document including a second page of the document to the final page of the first group to the PDF format. The final page corresponds to a page size value to cause separation of the first group. The method also includes generating a second PDF file for the first group of pages.

A method for printing a document from a computing device at a printer driver over a network is disclosed. The method includes receiving the document at a printer driver at a computing device connected to the network to convert to a PDF format supported by the printing device. The method also includes generating a first PDF file from a first page of the document. The method also includes generating a second PDF file from a first group of pages of the document after the first page. A size of the first group of pages corresponds to a parameter of the printing device. The method also includes combining the first PDF file and the second PDF file into an output PDF file from the printer driver. The method also includes processing the output PDF file at the printing device to separate the first PDF file and the second PDF file.

A system to print a document from a computing device to a printing device over a network. The computing device executes a software application. The system includes a printer driver on the computing device configured to convert a document to a PDF format. The printer driver also is configured to generate a first PDF file of a first page of the document. The printer driver also is configured to generate a second PDF file of a first group of pages following the first page of the document. A size of the second PDF file corresponds to a page size value based on a parameter of the printing device. The printer driver also is configured to combine the first PDF file and the second PDF file into a single output file. The system also includes a PDF interpreter on the printing device configured to separate the first PDF file and the second PDF file from the output file. The PDF interpreter also is configured to output the first PDF file for printing. The PDF interpreter also is configured to output the second PDF file for printing.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

The disclosed embodiments relate to an imaging system and method of effectively printing documents. The disclosed system can include a document to PDF converter to convert, separate, and group converted PDF pages to several distinct PDF file based on page sizes, page complexity, page location, and printing device limitations. The divided PDF files are interpreted internally in the MFP separately and sequentially so that system performance can be improved because the first page and early parts of the data for the document can be immediately processed for printing.

In order to solve performance issues, the disclosed embodiments employ a PDF converter that generates a plurality of PDF files for a document instead of a single PDF file. The different PDF files may be generated based on specified parameters, such as document page size, page location within the document, page complexity, and printer device storage limitation. The parameters may be related to capabilities of the MFP, such as data storage. A PDF interpreter performs stream detection to internally separate print jobs for the different PDF files. This feature allows big PDF documents to be processed separately so that the first page and the front part of the document do not need to wait for all data to be received within the MFP to begin printing operations.

The PDF converter may implement a processing flow for a received document. While the PDF converter converts pages of the document to the PDF format as supported on the MFP, it also performs application procedures. First, the PDF converter may obtain the current converted PDF page data size. After the current, or first, page is converted to a PDF page, a PDF page data size is obtained by the PDF converter. The PDF page data size relates to a value that is the maximum size, or number of pages, to be used for a separate PDF file. Printers may have device storage and performance limitations such as disk size, memory size, and printing speed. If the entire PDF document data size is too big it may overflow the device storage or slow down printing speed due to running out of memory. This condition may cause a printing error, thereby resulting in the document not printing. If input data size in the form of the PDF file can be limited to the allowed size for certain devices, then this action should result in good printing performance.

The PDF converter also accumulates the current page size to the added page size value from previous pages sizes. The PDF converter limits the added page size to a device divided size so that it never overflows the device storage and keep the MFP performing at the best processing speed. After the current page is converted to PDF data, the PDF converter checks for certain conditions. If the current page matches one of the conditions, then the PDF converter generates a PDF file without waiting for remaining incoming data.

If the current page is the first processing page of the document, then the PDF converter generates the first page as a separate PDF file. The page does not have to be page 1 of the document, but the first processing page of the document. In other words, if the document has an introduction or other initial page that is not "page 1" of the document, then it may be used for this first PDF file. The generated PDF file may be sent for printing operations.

At the same time that the first PDF file is being generated, the PDF converter continues to convert the second page. Starting from the second page, the size, or number, of pages is accumulated to the added page size value. If the accumulated added page size is greater than a device divide, or file, size, then the PDF converter generates a PDF file without waiting from remaining incoming data. The output PDF file includes pages from the previous un-outputted pages to the current page. For example, if this is the second PDF file after the first page PDF file, then the file size includes the second page up to the current page data.

In alternative embodiments, the disclosed process detects if the current PDF page is complex. "Complex" can refer to a page having increased processing time due to content, graphics, color, and the like. For example, a large color-based raster image takes a considerable amount of time for color conversion. Full page transparency also takes a longer processing time for pixel blending. When a page of a document is too complex, the PDF converter should process this kind of page as soon as possible. When detecting such a complex page, the disclosed process converts and generates the PDF file without waiting for remaining incoming data or pages. A page complex flag may be turned on to indicate that the page should be processed and the PDF file is generated. The output PDF file includes pages from previous processed pages to the current complex page.

How to determine a complex page may depend on parameters or limitations of the MFP. A parameter for determining a complex page may include MFP memory limitations, a device memory limitation of the PDF conversion that takes place away from the MFP, toner levels, and the like. For example, a two-megabyte (MB) picture is embedded in a document. The page with 2 MB picture is received by the PDF converter. The PDF converter compares the data size of the page with a complex parameter value to process the resulting PDF file. The memory of the MFP may be limited to 2 MB of storage such that a larger PDF file would not be printed.

Thus, during the PDF conversion process, the disclosed embodiments check for specific conditions after the current page is converted. If the current page matches one of the specific conditions, then the PDF converter generates a PDF file without waiting for remaining incoming data. This feature speeds up processing for large documents and files. The specific conditions may include being the first page of the documents, having a maximum number of pages or file size, and being a complex page. If the current page does not match a specific condition, then the PDF converter continues to process the next page. The processing continues until a condition is met or the last page of the document is processed.

In some embodiments, direct office document printing is being performed. Instead, a software application creates a document that is sent for printing. A printer driver is used on a computing device, such as a computer or mobile smart device, to receive the document from the software application. The printer driver functions like the PDF converter. Documents having extensions such as .docx, .xlsx, .pptx, and the like are sent to the printer driver from a software application. Software application may refer to word processor applications, spreadsheet applications, slide generation applications, and the like.

The printer driver converts the document from the application into a PDF file. The printer driver may convert application drawing commands to the PDF format. It also may perform getting the current converted PDF page data size to accumulate the current page size to the page size value for the previous page sizes and detect if the current PDF page is complex. As with the direct printing embodiments, the printer driver may check to see if specific conditions are met. These conditions may include a first page of a document, the accumulated page size of the converted pages exceed a value, or the converted page is complex. These processes may correspond to the ones disclosed for the direct document printing processes.

If a condition is met, then the PDF file for that page or group of pages is generated. The printer driver does not wait until the end of the document to send a PDF file to the printer. Instead, the printer driver makes the PDF file without waiting for incoming data. The PDF file may contain pages from previous un-outputted pages. A flag may be set to alert the rest of the components of the printer driver that the PDF file is being created. Processing of the next group of pages may begin without waiting for the PDF file to be generated. If none of the conditions are detected, then the printer driver continues to process the next page(s) in the document. The above-disclosed processing continues until the printer driver converts the last page of the document.

The printer driver is located outside the MFP. Before the converted PDF files are sent to the MFP, the printer driver regroups the plurality of PDF files in a single output PDF file so that the print job manager still treats the plurality of PDF files as one print job. Otherwise, the different PDF files may not be received in order or may be interrupted in the printing process by other print jobs. A user would like to print all the files for the document together. The printer driver may insert page divider strings in the separate PDF files so that the PDF interpreter knows when to separate them within the MFP.

For both types of printing, document printing performance is improved. The improvement rate varies based on the document page contents. The improvement rate for printing increases for longer or more complex documents. As one PDF file includes several sub-files, the PDF interpreter may separate the processed files out and send them to the printing components for the MFP. The MFP begins printing a PDF file without having to wait for a subsequent file to process.

Figure 1:
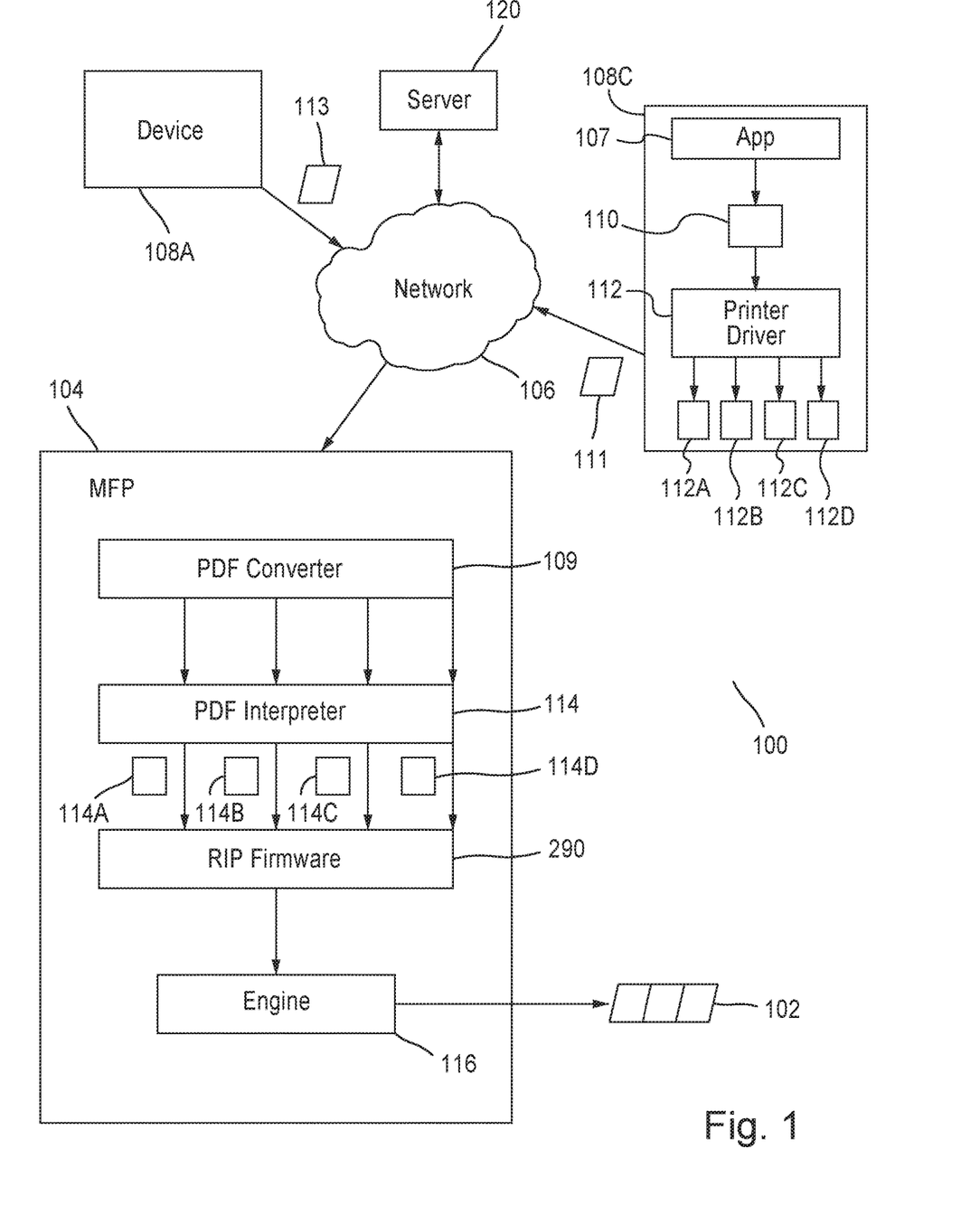
FIG. 1 illustrates a system for printing a document on an MFP according to the disclosed embodiments.

FIG. 1 depicts a system 100 for printing a document 110 on an MFP 104 according to the disclosed embodiments. System 100 shows an example architecture that includes a network 106, which connects various devices and platforms to MFP 104. For example, devices 108A and 108C along with server 120 are connected to network 106. Device 108A may send document 113 to MFP 104 over network 106 while device 108C sends document 111. In some embodiments, the devices are mobile or handheld devices that connect to network 106. System 100 may provide direct document printing capability to the devices to print at MFP 104. MFP 104 also may be known as a printing device. MFP 104 includes the printing device along with other capabilities, such as a copier device, scanning device, facsimile device, and the like.

Document 113 is shown being sent to network 106. Network 106 then forwards document 113 to MFP 104. In other embodiments, the devices may connect directly with MFP 104 such that documents 113 are provided to the MFP without going over network 106. An example of such an embodiment may be a device connected through a universal serial bus (USB) port or a cable to MFP 104. In some embodiments, the format of a document 113 corresponds to the program that created the documents. Device 108A may send document 113 with a format for a word processing application. The document may be converted into one or more PDF files at MFP 104 by PDF converter 109.

In other embodiments, a document is not directly printed on MFP 104. Instead, a software application 107 is used to create a document 110 that is received at a printer driver 112. Printer driver 112 formats document 110 for printing. Printer driver 112 also converts document 110 into the PDF format. The resulting file is sent to MFP 104 as output file 111. Output file 111 may be received by PDF interpreter 114 instead of PDF converter 109.

Once document 110 is sent for printing by application 107, printer driver 112 processes the document to generate at least two or more PDF files. These different files are shown in FIG. 1 as PDF files 112A, 112B, 112C, and 112D. PDF files 112A-D are generated according to the processes disclosed below. Thus, instead of one PDF file, document 110 is separated into two or more PDF files according to specific criteria. PDF file 112A corresponds to the first page of document 110. It is the first page in a PDF format. PDF file 112B represents a set of pages starting from the second page of document 110 to a maximum number of pages. The size of PDF file 112B may correlate to the number of pages of document 110 able to be processed by PDF converter 109. A limit on the size of the PDF files may correspond to a parameter of MFP 104, such as disk size, memory size, and printing speed. PDF file 112C also represents a set of pages of document 110. In some embodiments, the number of pages, or size, of PDF file 112C is similar to the number of pages of PDF file 112B. PDF file 112D also is a set of pages of document 110 but includes the final page of the document. PDF converter 109 monitors the conversion of pages of document 110 to determine when to generate a PDF file.

PDF files 112A-D are independent of application software, hardware, and operating systems of devices 108C. Each PDF file encapsulates a complete description of a fixed-layout flat document, including the text, fonts, vector graphics, raster images, and other information needed to generate printed document 102. The PDF files also may include logical structuring elements, interactive elements such as annotations and form-fields, layers, rich media (including video content) and three-dimensional objects using universal 3D (U3D) or product representation compact (PRC), and various other data formats.

PDF interpreter 114 receives the PDF files from printer driver 112. PDF interpreter 114 generates rendering instructions for the PDF files. For example, the instructions may determine how to display the document embodied by the PDF files at MFP 104. PDF interpreter 114 also performs stream detection on output file 111 containing PDF files 112A-D to do internal job separation of each file. This feature allows large documents to be processed separately in MFP 104 such that one PDF file does not have to wait for a subsequent PDF file to be placed in a print job queue. Thus, PDF interpreter 114 generates processed files 114A-D that correspond to PDF files 112A-D, respectively. In other words, processed file 114A corresponds to PDF file 112A, and so on.

A feature of PDF interpreter 114 is the ability to detect the end of a PDF file and send it downstream for printing. In other words, processed file 114A is sent for printing while PDF interpreter 114 processes PDF file 112B. PDF interpreter 114 may detect or determine existence of a divider string within a PDF file. In some embodiments, the divider string may be placed at the end of the PDF file. The divider string indicates that no more pages are to be processed for that PDF file. The processed batch of pages may be sent for printing in MFP 104. Divider strings may be used when PDF interpreter 114 receives PDF files 112A-D as an output file 111 from printer driver 112. Generation and receipt of such a single file is disclosed in greater detail below.

Raster image processing (RIP) firmware 290 is used to convert PDF files into a raster format suitable for imaging onto paper and other media in printers. RIP firmware 290 outputs a raster image of the pages within processed PDF files 114A-D. RIP firmware 290 may be a processor on MFP 104. After conversion into the raster format, the files are sent to engine 116 as a print job. Engine 116 causes MFP 104 to print printed document 102.

Thus, device 108C sends output file 111 already having a PDF format to MFP 104. Device 108C includes printer driver 112 executing on its computing platform to convert the input document into the PDF file that is sent to MFP 104. The processes regarding providing documents to MFP 104 differ for a device hosting one or more software applications 107. Use of printer driver 112 on device 108C may be applicable if MFP 104 does not support the application generated document 110 thereon. For example, PDF converter 109 does not support the generation of PDF files of documents created with an application on device 108C. It is better to convert the document to a PDF file at device 108C. The applicable code for performing the disclosed embodiments may be placed in printer driver 112 as opposed to updating MFP 104.

PDF files 112A-D of printer driver 112 are grouped into an output file 111. Output file 111 differs from document 110 in that it is already converted into a PDF format. Output file 111 is received at PDF interpreter 114, which breaks apart the received file into its component PDF files and processes each file individually, as disclosed above. This feature allows for PDF conversion to occur at device 108C so that resources in MFP 104 are not tied up. Further, the format used by application 107 on device 108C may not be supported by MFP 104. MFP 104 may be a legacy printer that has not been updated in a long time. Use of printer driver 112 with PDF interpreter 114 allows for printing on MFP 104 from a unsupported or unrecognized application.

Another feature of printer driver 112 is that it may send different PDF files to different MFPs. MFP 104 may be busy with other print jobs and only able to process PDF file 112A in a timely manner. Printer driver 112 determines the delay in processing on MFP 104 and send PDF file 112B to another MFP. Alternatively, it may store subsequent PDF files at server 120 for later retrieval by MFP 104.

Figure 2:
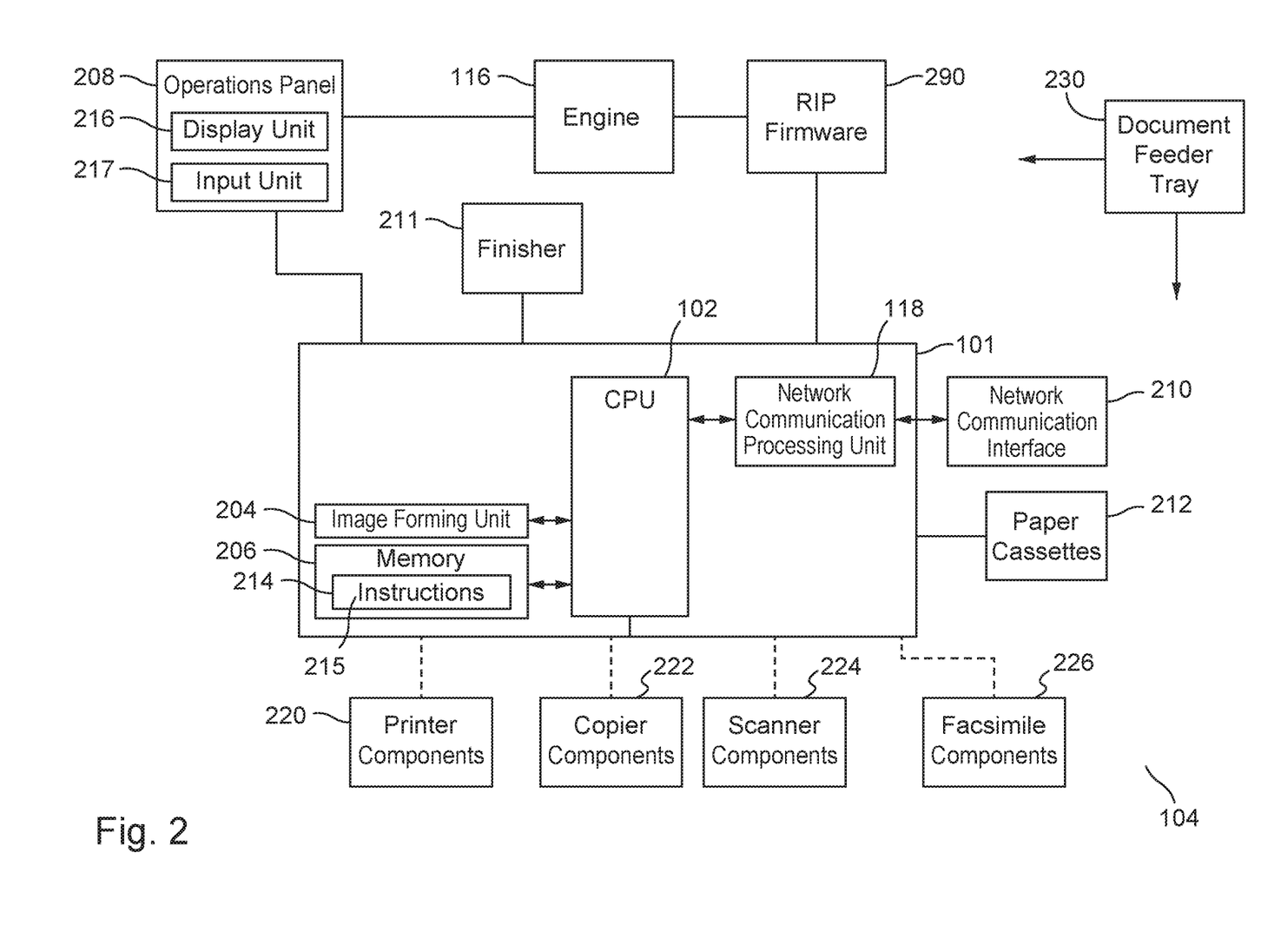
FIG. 2 illustrates a block diagram of components of the MFP according to the disclosed embodiments.

An example of MFP 104 architecture may be shown in FIG. 2. The architecture shown in FIG. 2 may apply to any multi-functional printer or image forming apparatus that scans documents to perform other functions, such as printing, storing, copying, and the like. RIP firmware 290, as shown, is connected to engine 116, which, in turn, is connected to the other components of MFP 104. RIP firmware 290 may receive processed PDF files to print from PDF interpreter 114.

MFP 104 includes a computing platform 201 that performs operations to support these functions. Computing platform 201 includes a computer processing unit (CPU) 202, an image forming unit 204, a memory unit 206, and a network communication processing unit 218. Other components may be included but are not shown for brevity. MFP 104, using computing platform 201, may be configured to perform various operations, such as scanning, copying, printing, receiving or sending a facsimile, or document processing. As such, MFP 104 may be a printing device or a multi-function peripheral including a scanner, and one or more functions of a copier, a facsimile device, and a printer. To provide these functions, MFP 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

MFP 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like. Paper cassettes 212 supply paper to the various components 220, 222, 224, and 226 to create the image formed surfaces on the papers. Paper cassettes 212 may include papers having various sizes, colors, composition, and the like. Paper cassettes 212 may be removed to refill as needed.

Document processor input feeder tray 230 may be the physical components of MFP 104 to receive papers and documents to be processed. A document is placed on or in document processor input feeder tray 230, which moves the document to other components within MFP 104. The movement of the document from document processor input feeder tray 230 may be controlled by the instructions input by the user. For example, the document may move to a scanner flatbed for scanning operations. Thus, document processor input feeder tray 230 provides the document to scanner components 224. As shown in FIG. 2, document processor input feeder tray 230 may interact with engine firmware 116 to perform the desired operations.

Memory unit 206 includes memory storage locations 214 to store instructions 215. Instructions 215 are executable on CPU 202 or other processors associated with MFP 104, such as any processors within components 220, 222, 224, or 226. Memory unit 206 also may store information for various programs and applications, as well as data specific to MFP 104. For example, a storage location 214 may include data for running an operating system executed by computing platform 201 to support the components within MFP 104. Memory unit 206 also may cache data or files from PDF converter 109 or PDF interpreter 114. Alternatively, memory unit 206 may cache data from printer driver 112.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause MFP 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors cause MFP 104 to act as a printer, copier, scanner, and a facsimile device.

MFP 104 also includes an operations panel 208, which may be connected to computing platform 201. Operations panel 208 may include a display unit 216 and an input unit 217 for facilitating interaction with a user to provide commands to MFP 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Input unit 217 includes a touch-screen digitizer overlaid onto display unit 216 that senses touch to receive inputs from the user. By this manner, the user interacts with display unit 216. Devices 108A and C may be connected via operations panel 208 to engine 116.

MFP 104 also includes network communication interface 210. Network communication processing unit 218 may establish a network communication, such as a wireless or wired connection with one or more other image forming apparatuses and a server in an image forming system using network communication interface 210. For example, CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on MFP 104. CPU 202 also may retrieve information stored in memory unit 206, such as settings for MFP 104.

MFP 104 also includes engine 116. Engine 116 may be a combination of hardware, firmware, or software components that act accordingly to accomplish a task. For example, engine 116 is comprised of the hardware components and software components to print a document. It may receive instructions from computing platform 201 after the user provides inputs via operations panel 208. Alternatively, engine 116 may receive instructions from devices 108A-C.

Engine 116 manages and operates the low-level mechanism of the MFP engine, such as hardware components that actuate placement of toner onto paper. Engine 116 may manage and coordinate the half-toner, toner cartridges, rollers, schedulers, storage, input/output operations, and the like. Raster image processor (RIP) firmware 290 interprets the page description languages (PDLs) to transmit and send instructions down to the lower-level engine 116 for actual rendering of an image and application of the toner onto paper during operations on MFP 104.

Figure 3:
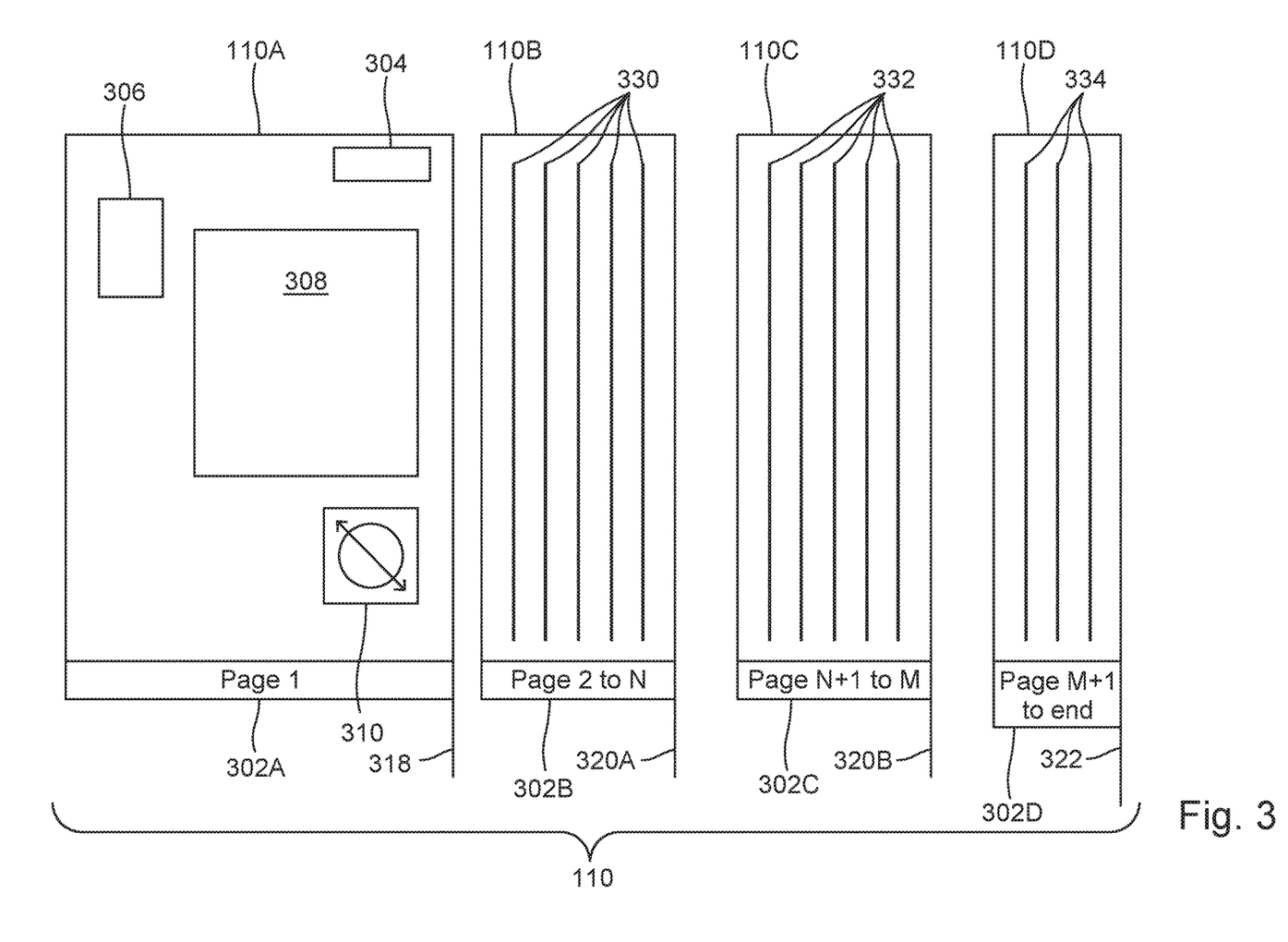
FIG. 3 illustrates an example set of grouped files generated from a document to print on the MFP according to the disclosed embodiments.

FIG. 3 depicts an example document 110 to print on MFP 104 according to the disclosed embodiments. Document 110 is broken into the groups 110A-D that will be used for the PDF files, as determined by printer driver 112. These are the groupings that will be determined for the resulting PDF files. Groups 110A-D may correspond to PDF files 112A-D, respectively, generated by printer driver 112.

Group 110A of document 110 is the first page of the document. "Pages" are disclosed below, but document 110 also may include slides, tables, pictures, graphics, and the like, or any combinations thereof. The term page is used for brevity. Thus, size 302A of group 110A is one page. Printer driver 112 will process group 110A first. It will determine that it is the first page and stop processing to generate the PDF file. Within the first page, graphics and repeatedly used items may be identified. The graphics and repeatedly used items are cached by printer driver 112. For example, the identified items from the first page of group 110A may be cached in memory 206. Alternatively, MFP 104 may include another memory location to store the items. For a PDF converter outside MFP 104, the identified items may be cached within the device's memory or at another location within system 100, such as server 120.

Referring to FIG. 3, group 110A includes items within the page. These items may be repeated header 304, repeated graphic 306, and graphic 310. Group 110A also includes text 308 that is not repeated within document 110 and is particular to the first page. Printer driver 112 identifies the items for caching. The disclosed embodiments may identify objects or graphic items that are not text for caching. Graphic 310 may be a logo or other item that takes processing time in printer driver 112. Printer driver 112 converts it for the first page and caches the converted graphic, in page description language, for use in other parts of document 110. This feature saves time for processing graphic 310 repeatedly.

Repeated header 304 also is identified. Printer driver 112 may identify specific areas of the first page to determine whether headers, footers, salutations, and the like, or any other text/graphic is repeated on every page. The first page also may include repeated graphic 306. This item may be a line at a margin of every page in document 110, a logo, and the like. The first page may include additional repeated items and graphics. Further, the items shown in FIG. 3 may be placed anywhere on the first page. Printer driver 112 also caches the converted page description language for repeated header 304 and repeated graphic 306 along with instructions to determine whether they should apply to the subsequent pages. Printer driver 112 may compare the items with portions of subsequent pages to determine if they apply for processing with those pages.

The feature of caching objects within the first page allows separate groups of PDF files to be formed. A reference library, for example, for document 110 may not be needed or eliminated. Dependencies within the document are broken as processing of pages after group 110A do not need reference back to the first page.

Printer driver 112 also processes text 308. Text 308 may refer to data that is not repeated in document 110 or particularly complex. "Text" may refer to any type of data that is commonly found in documents, and also may include graphics and the like. Printer driver 112 processes text 308 using normal PDF conversion steps. After the first page is converted to PDF data, printer driver 112 determines that a condition is met to generate a PDF file. In this instance, it is the first page condition. Page size value 318 may be one but it indicates that this is the first page of document 110. Thus, group 110A is converted and PDF file 112A is generated. Size 302A of group 110A is one page. Printer driver 112 may begin processing the second page of document 110 during generation of PDF file 112A.

Group 110B of document 110 differs from group 110A in that it includes multiple pages 330. Printer driver 112 will continue processing pages of document 110 into a single PDF file. Each time a page 330 is converted, a page size value 320A is adjusted. After processing a plurality of pages, the page size value, or size 302B, reaches a set limit, or a device divide size value. This limit may correspond to a parameter of MFP 104 or, in the case of printer driver 112, device 108C. The applicable printer driver limits the page size value to the device divide size value so that the MPF or device storage does not overflow. In other words, this feature avoids a condition where the PDF file is too large to store in device memory. It also keeps MFP 104 performing at an optimal processing speed. As shown in FIG. 3, the size of group 110B may be pages 2 to N. In some embodiments, the device divide size value may set a number of pages that can be processed before generating the resulting PDF value. In other embodiments, the device divide size value may depend on a size 302B of group 110B, such that processing is cut off once the amount of processed data reaches a certain amount.

Printer driver 112 may retrieve cached objects from group 110A to process within group 110B. This way, group 110B is not dependent on group 110A. Further, the resulting PDF file for group 110B will be independent from the one for group 110A. These objects may include repeated header 304 and repeated graphic 306. If graphic 310 is applicable to one of pages 330, then it also is included.

The same processes may be used for group 110C having pages 332. The number of pages 332 in group 110C may go from page N+1, or the page right after the end of group 110B, to M. M may be equal to N in that groups 110B and 110C include the same number of pages. Thus, group 110C also is subject to page size value 320B. Alternatively, M may not be equal to N and more dependent on an equal size of the processed data in that size 302B is approximately equal to size 302C. This feature keeps the size of the resulting PDF files consistent. The cached objects also may be retrieved to include in processing of pages 332.

Additional groups may be processed subject to the conditions disclosed above. The processing stops and a PDF file is generated when the number of pages processed by printer driver 112 reaches a page size value at or greater than the device divide size value, or the processed data for a group is a certain size. This process continues until the end of the document is reached. Here, group 110D indicates the final group of pages 334 to be processed. Group 110D may be smaller than groups 110B or 110C. The processing steps do not stop upon reaching a page size value limit but reaching the last page of the document. This condition may be indicated by the end of document value 322. The number of pages 334 may be from M+1 to the end of document 110. The cached objects from group 110A, or the first page, may be retrieved and applied in the processing of pages 334 as needed.

Figure 4:
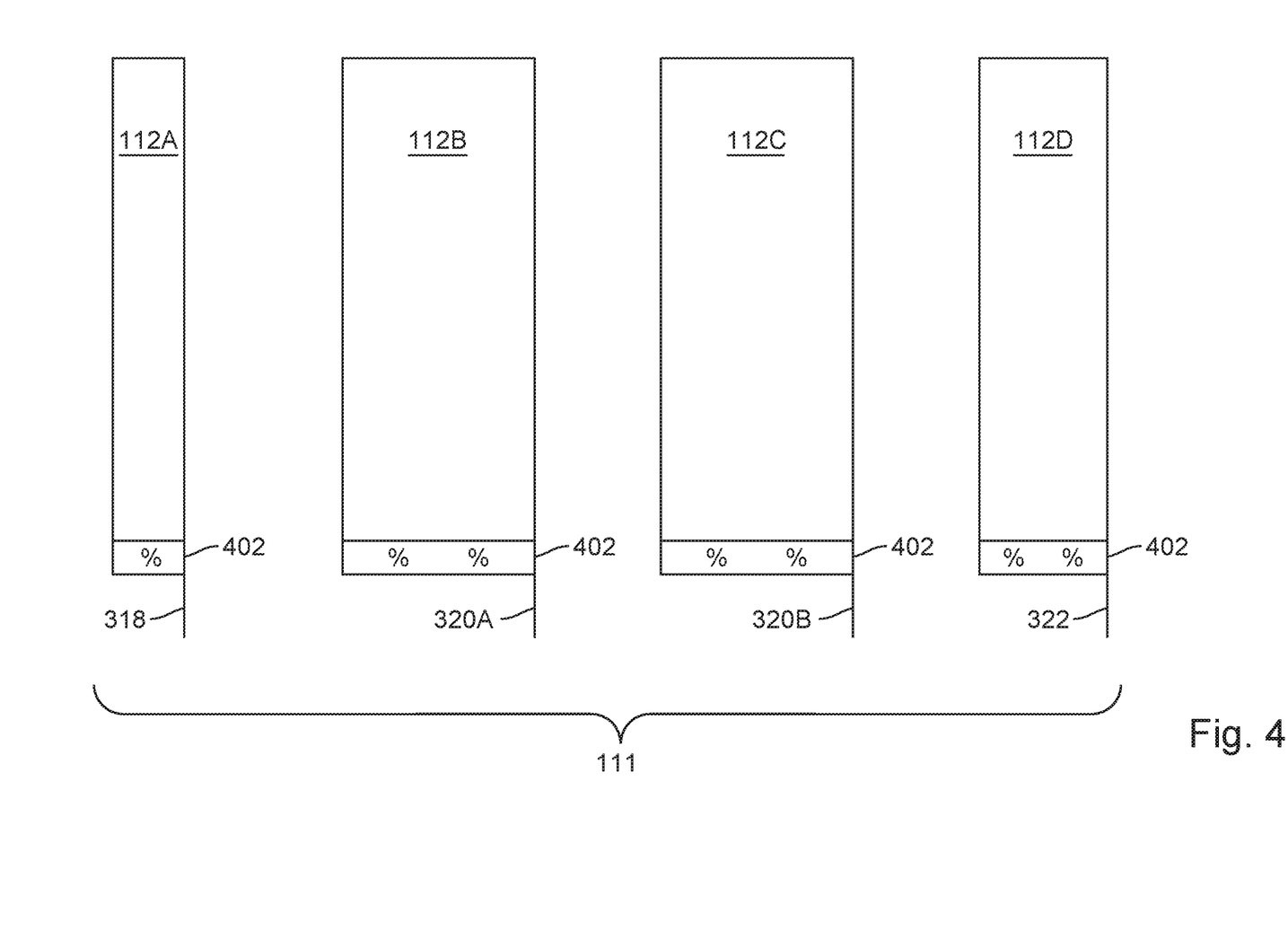
FIG. 4 illustrates PDF files that correspond to the converted groups of pages according to the disclosed embodiments.

FIG. 4 depicts PDF files 112A-D that correspond to the converted groups of pages according to the disclosed embodiments. As noted above, PDF file 112A includes the PDF format data generated from group 110A, PDF file 112B includes the PDF format data generated from group 110B, PDF file 112C includes the PDF format data generated from group 110C, and PDF file 112D includes the PDF format data generated from group 110D. In other words, PDF file 112A represents the PDF data for the first page and has size 318 like group 110A. PDF file 112B represents the PDF data for pages 2 to N and has size 320A like group 110B. PDF file 112C represents the PDF data for pages N+1 to M and also has size 320B like group 110C. PDF file 112D represents the last group of pages of the document from page M+1 to the end and has size 322 like group 110D.

These files are processed separately by PDF interpreter 114 and, subsequently, to RIP firmware 290 and engine 116 for printing. Because the files are separate, they do not have to be received together to begin printing operations. If PDF files 112A-D are processed by PDF converter 109 of MFP 104, then no further modifications to the data in the files should be needed.

PDF files 112A-D can be processed in a device separate from MFP 104. The files, however, are treated differently, as shown in FIG. 4. PDF files 112A-D may not be sent as separate files from device 108C to PDF interpreter 114. One reason may be that the different files would come into MFP 104 as different print jobs such that the pages of the document are not printed together. This condition would cause confusion and uncertainty with the printed document 102, especially for long print jobs that could have several separate print jobs come into MFP 104 at the same time.

To prevent the problems with separate PDF files, printer driver 112 places PDF files 112A-D back together as one file, or output file 111 shown in FIG. 1. Output file 111 may be similar to document 110 in that it is received at MFP 104 as one print job. The output file differs from the non-converted documents in that the PDF files already exist so that the disclosed process of determining specific conditions does not need to occur. The PDF files, however, should be separated to provide the benefit of smaller PDF files for printing operations.

The disclosed embodiments separate PDF files 112A-D by inserting a divider string 402 at the end of each PDF file. Printer driver 112 places divider strings 402 into the PDF files before re-grouping them back together. In a sense, output file 111 is a PDF file having two or more sub-files. Upon receipt at MFP 104, the print job manager treats the received file as one print job that is processed by PDF interpreter 114 together.

PDF interpreter 114, however, needs to separate output file 111 into PDF files 112A-D. Thus, it looks for divider strings 402 to separate the PDF files. Upon detection of a divider string 402, PDF interpreter 114 stops processing and sends the PDF file to RIP firmware 290 for printing. Printing operations are not held up waiting for later PDF files to be processed. These features are disclosed in greater detail below.

Figure 5:
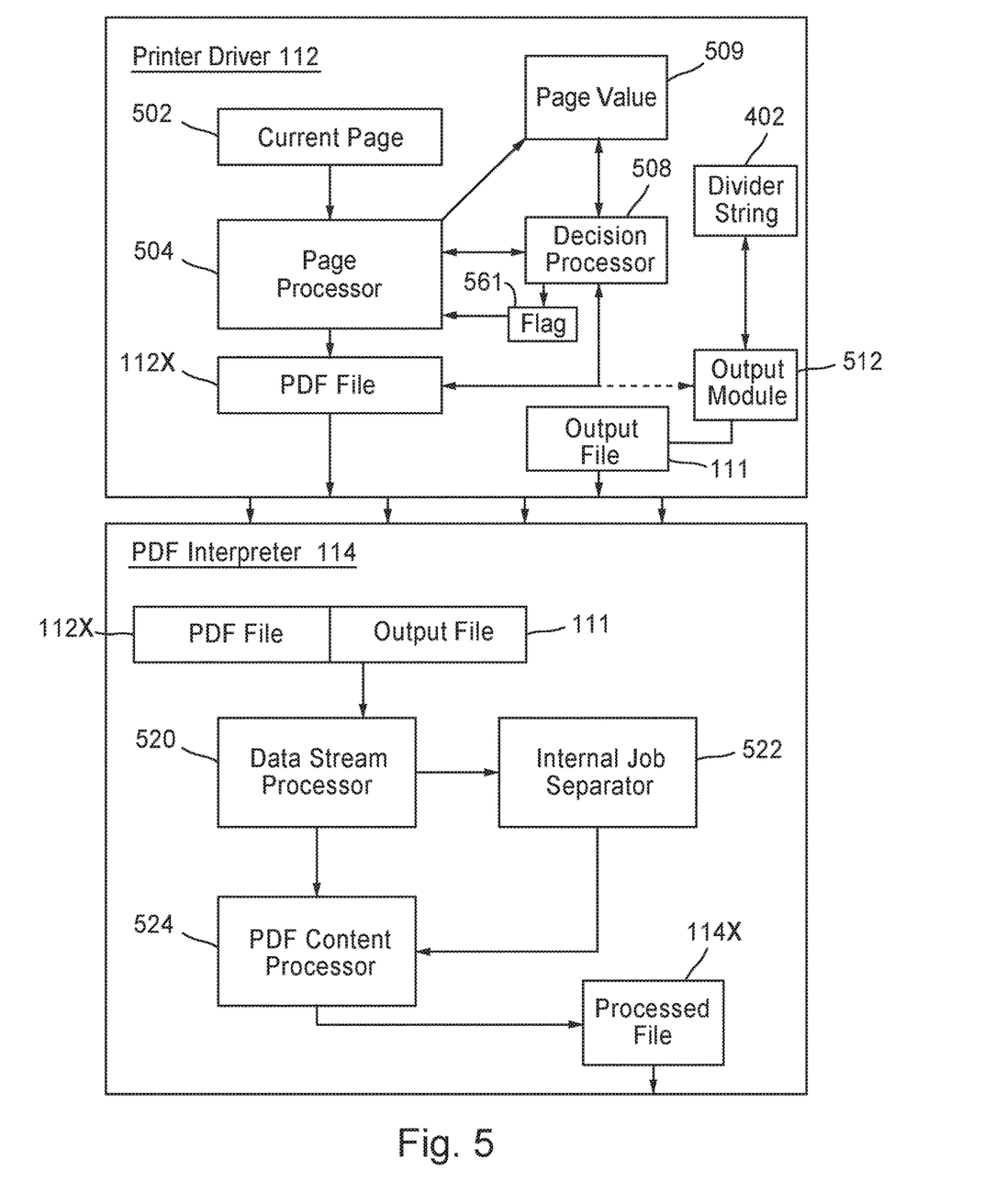
FIG. 5 illustrates a block diagram of the PDF converter and the PDF interpreter according to the disclosed embodiments.

FIG. 5 depicts a block diagram of printer driver 112 and PDF interpreter 114 according to the disclosed embodiments. FIG. 5 illustrates components that may be implemented in the converter and the interpreter. Although printer driver 112 is disclosed, the features disclosed below also apply to a PDF converter inside MFP 104, such as PDF converter 109.

Printer driver 112 receives a document 110, preferably with pages or some other discrete part of the document, such as slides, pictures, tables, and the like, or any combination thereof. For brevity, the part of the document for processing by printer driver 112 may be known as current page 502. The current page is received at page processor 504, which generates PDF file 112X. PDF file 112X may represent any of PDF files 112A-D disclosed above.

In addition, page processor 504 also updates current page size value 509 after current page 502 is converted into a PDF format. Current page size value 509 may refer to a number of pages currently being processed until a limit is reached. It also may refer to a size of data for the converted pages. After the current page is converted and the current page size value is updated, decision processor 508 checks for specific conditions that will trigger to generate a PDF file. These conditions may include whether current page 502 is the first page of the document. If so, then PDF file 112X is generated. In this instance, PDF file 112X corresponds to PDF file 112A disclosed above.

Another condition may be whether the added page size value is greater than the device divide size value. As disclosed above, the limit for current page size value 509 for groups of pages may correspond to a parameter within MFP 104, such as storage within the device, memory size for storing the converted data, processing speed, printing limitations, and the like. The device divide size value reflects the upper limit of the parameter to process a PDF file in printer driver 112 or print the document at MFP 104. Once the condition is met of reaching this upper limit, then PDF file 112X is generated. In this instance, PDF file 112X may correspond to PDF files 112B or 112C disclosed above.

Other conditions may be implemented, as needed. A final condition may be whether current page 502 is the last page of the document. If so, then PDF file 112X is generated, which corresponds to PDF file 112D disclosed above. Alternatively, page processor 508 may not be needed to determine the end of document.

Because printer driver 112 is located outside MFP 104 then additional components are used to create output file 111 that includes all of the PDF files generated from document 110. PDF files 112X are sent to output module 512 until the final file is received. As each PDF file is received, divider string 402 is inserted within the file. Preferably, divider string 402 is inserted at the end of the file data by output module 512. Output module 512 then generates output file 111.

PDF interpreter 114 may receive either PDF file 112X from a PDF converter in MFP 104 or output file 111 from a printer driver outside MFP 104. The applicable PDF file is received at data stream processor 520, which monitors the PDF data to identify whether a divider string 402 is within the file. When a divider string is detected, internal job separator 522 outputs the partial stream data of output file 111 prior to the string to PDF content processor 524. The divided files within output file 111 may be processed separately and sequentially. Processed file 114X from PDF content processor 524 is sent to components in MFP 104 for printing operations, such as RIP firmware 290. Processed file 114X is treated as a single print job. Processed file 114X may correspond to processed files 114A-D disclosed above.

According to some embodiments, a processed file is provided by PDF interpreter 114 without waiting for the entire document to be converted and processed. The different PDF files and processed files fit within the parameters for MFP 104 so that it is not overburdened or inefficient for printing operations. The disclosed embodiments apply to printer drivers outside MFP 104, where processing is offloaded to free up resources of the MFP.

Figure 6:
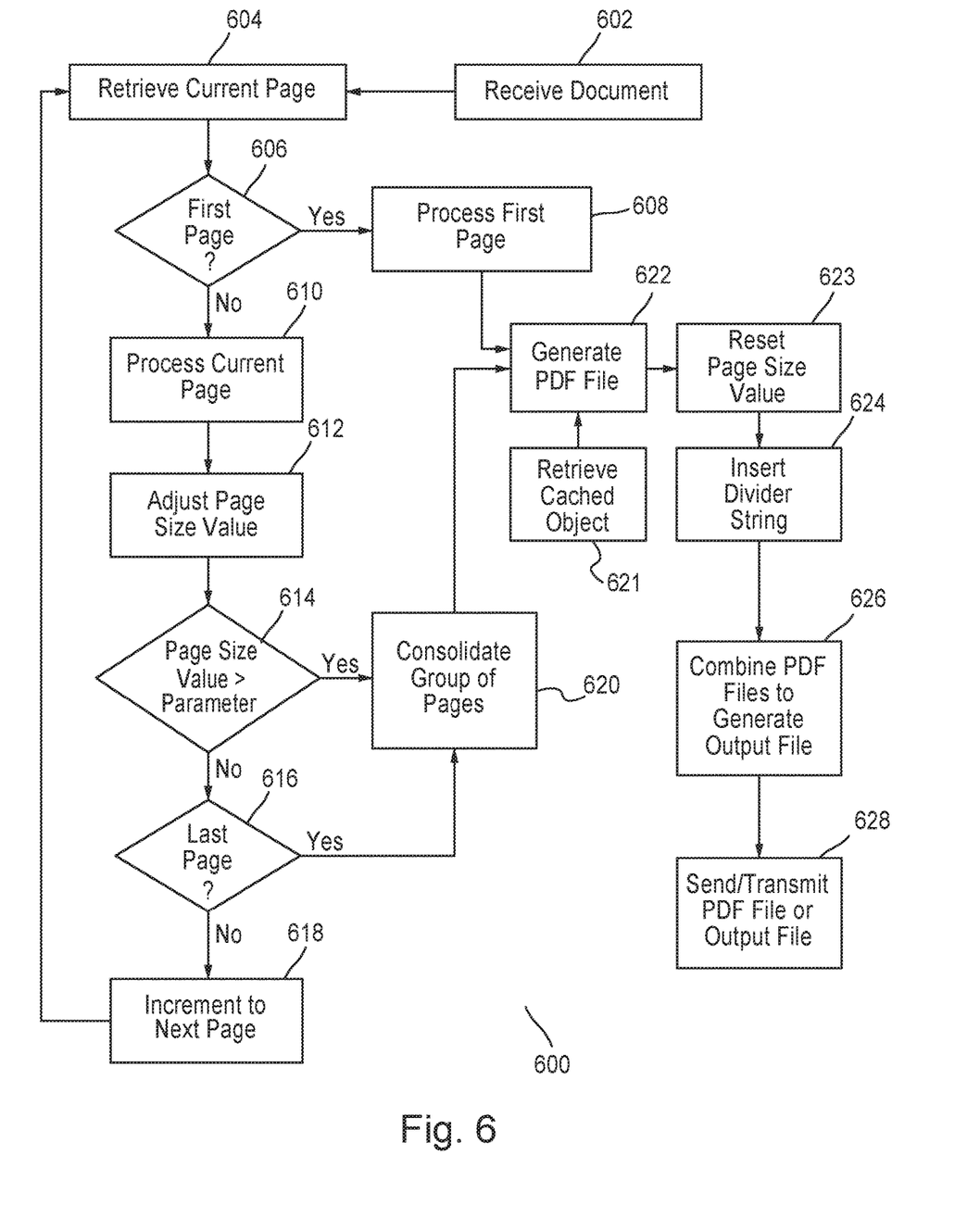
FIG. 6 illustrates a flowchart for printing a document at the MFP according to the disclosed embodiments.
Figure 7:
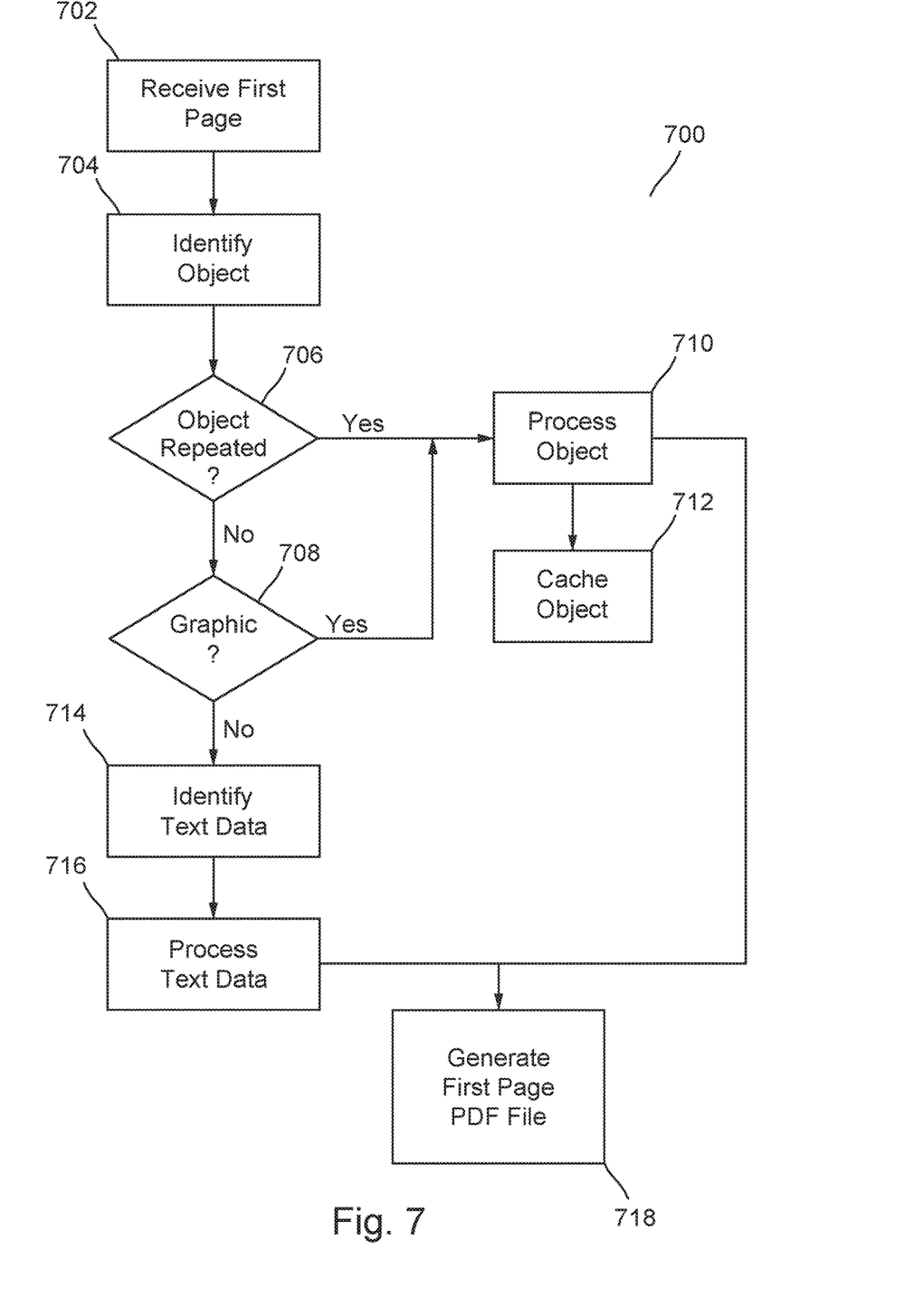
FIG. 7 illustrates a flowchart for processing the first page of a document into a PDF file according to the disclosed embodiments.
Figure 8:
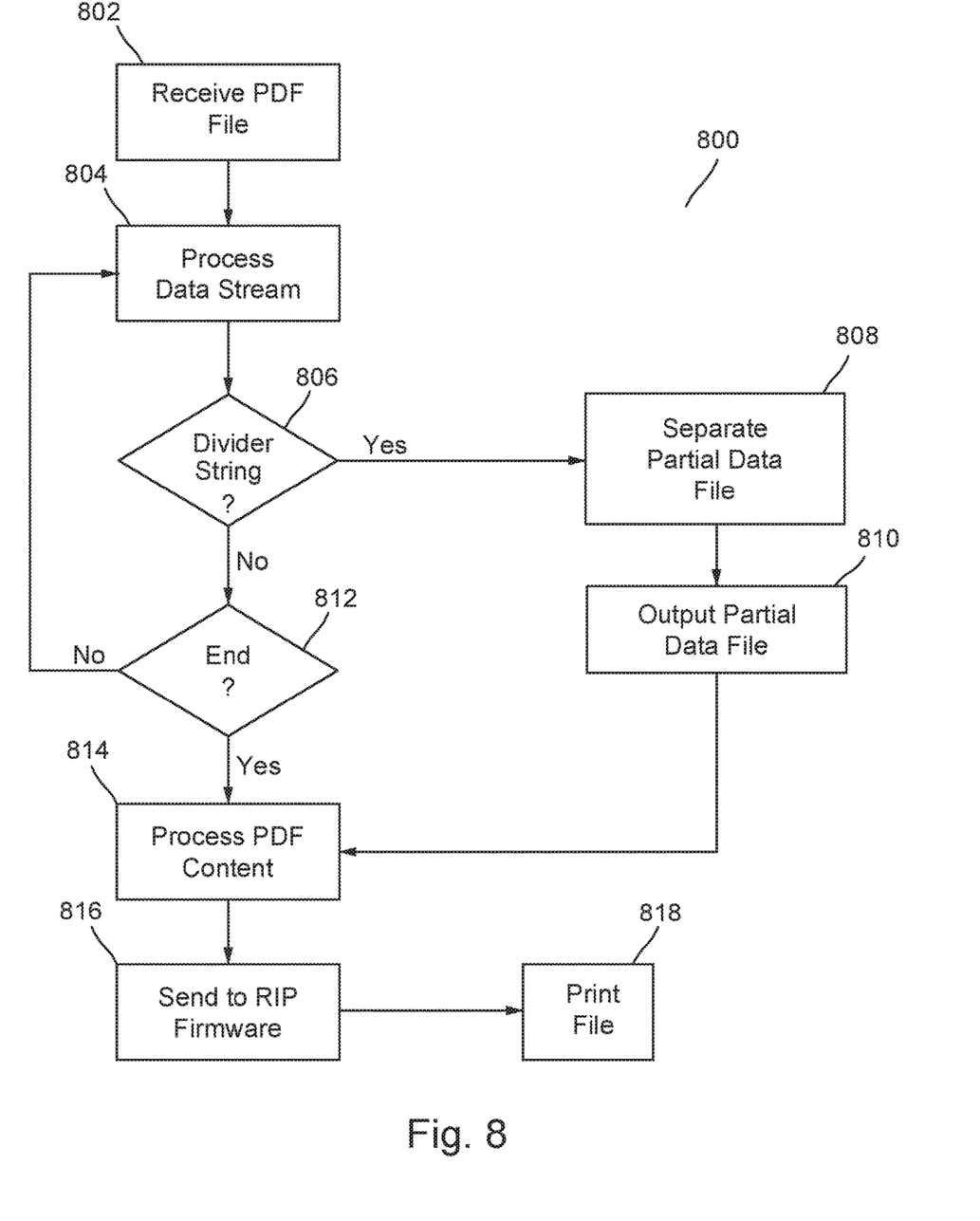
FIG. 8 illustrates a flowchart for processing the PDF files at a PDF interpreter according to the disclosed embodiments.

FIGS. 6-8 disclose processes implemented by the components of system 100 to print a document directly to MFP 104. The components are referenced as disclosed above to illustrate printing the document using a printer driver and a PDF interpreter. Additional components and features also may be used, and the implementation of the processes shown in FIGS. 6-8 are not limited to the components disclosed above.

FIG. 6 depicts a flowchart 600 for printing document 110 at MFP 104 according to the disclosed embodiments. Step 602 executes by receiving document 110 at printer driver 112. Alternatively, document 110 may be received by PDF converter 109. Step 604 executes by retrieving current page 502 of document 110 for processing to convert from an application format for software application 107 to the PDF format. Flowchart 600 will process each page until the end of the document is received.

Step 606 executes by determining whether current page 502 is the first page of document 110. The "first page" may be shown by group 110A in FIG. 3. Decision processor 508 of printer driver 112 may determine that this is the first page of a new document. The first page does not necessarily need to be page 1 of the document and can be the first processing page. If yes, then 608 is executed by processing the first page. The first page is processed separately from the other pages to obtain data that will allow objects and other data to be used in subsequent PDF files. The process for the first page is disclosed in greater detail by FIG. 7. After the first page is processed, flowchart 600 passes to step 622 to generate a PDF file.

If step 606 is no, then step 610 executes by processing the current page to convert it to the PDF format. In some embodiments, the first page may be processed and converted into a PDF file while step 606 is executing. Further, step 610 may not need to wait for step 608 to be completed before starting. After the current page is converted, step 612 is executed by adjusting current page size value 509. Current page size value 509 may be stored in a register and is updated each time a page is converted. Printer driver 112 may adjust the current page size value by incrementing a page number value for the number of pages processed in this group. Alternatively, the current page size value may be incremented by the size of the PDF data generated by the converted page. As pages are converted, current page size value 509 increases.

Step 614 executes by determining whether the current page size value is equal to or greater than a parameter. The parameter may be a device divide size value, as disclosed above. The parameter may correspond to limitations or parameters of MFP 104, network 106, computing device 108C, or application 107. For example, the parameter may correspond to the storage available on MFP 104 for print jobs. Memory 206 or other data storage may have a specific size, such as 2 MB, set aside for print jobs. Thus, when the current page size value is equal to or exceeds 2 MB, a PDF file should be generated. In some embodiments, a limit may be implemented so as to not exceed the parameter. In this instance, the device divide size value may be 1.8 MB. When the current page size value exceeds 1.8 MB, the PDF file for this group of pages is generated.

If step 614 is no, then the current page size value is within the limits for printing the document. Step 616 is executed by determining whether the current page is the last page of the document. The last page should indicate the end of the document and that no more pages are to be processed. If step 616 is no, then step 618 executes by incrementing the processing of the document to the next page. Flowchart 600 returns to step 604 to retrieve the next page for processing.

If step 614 or step 616 is yes, then step 620 executes by consolidating the group of pages converted by printer driver 112. Unlike the PDF file for the first page, the subsequent PDF files may include multiple pages. Step 622 executes by generating the PDF file for the first page or the consolidated group of pages. As disclosed above, printer driver 112 generates PDF file 112X. As part of step 622, step 621 executes by retrieving any cached objects or the PDF data for an object identified by the first page processing performed in step 608. This feature is disclosed in greater detail below. Step 623 executes by resetting the page size value to zero (0) so that size accumulation starts over for the next group of pages from document 110.

The PDF files should be grouped back together to be sent as an output file 111 to MFP 104. This way, the document is received and printed together. Otherwise, the different PDF files may be printed out of order or not together as they would be treated as separate print jobs from device 108C. Thus, step 624 executes by inserting a divider string 402 at the end of each PDF file, if applicable. Alternatively, step 624 may execute after step 622 when the PDF file is generated. Divider string 402 indicates that the current set of PDF data should be separated from the remaining file for printing operations.

Step 626 also may execute by combining the PDF files along with the divider strings to generate a single output file 111. The separate PDF files are joined back together such that all of the PDF data from document 110 is captured in the output file. Step 628 executes by sending or transmitting output file 111 to MFP 104. Printer driver 112 may receive another document 110 for processing into PDF files. The processes after step 628 are disclosed by FIG. 8.

FIG. 7 depicts a flowchart 700 for processing the first page of a document into a PDF file 112A according to the disclosed embodiments. Flowchart 700 may correspond with step 608 of flowchart 600. Step 608, however, is not limited by the disclosure of flowchart 700.

Step 702 executes by receiving the first page from received document 110 as identified by printer driver 112. The printer driver may analyze the data on the first page to identify objects that should be used elsewhere in the document. The objects should be identified and treated separately from the regular text or data within the document. For example, the disclosed process may identify graphics, headers, footers, and the like that meet certain criteria as potential objects. Thus, step 706 executes by determining whether the object is one that may be repeated within document 110. The object may have a certain format that resembles a header, footer, document name, and the like.

If step 706 is no, then step 708 executes by determining whether the object is a graphic, such as a logo, table, picture, and the like that may be used elsewhere in the document. If step 706 or step 708 is yes, then step 710 executes by processing the object into PDF format. The object is represented by the PDF data generated after conversion. Step 712 executes by caching the object PDF data in a memory, such as memory 206, in MFP 104 or in the device connected to network 106. Alternatively, the object may be cached before processing and the conversion to PDF data performed when the current page is processed into PDF data. The object is provided on each page, as applicable, as it is being converted to PDF data. This action may be done by step 621 disclosed above in FIG. 6.

If the data within document 110 is not a repeated or graphic object, then step 714 executes by identifying the data within the first page for processing. This data may be text data. Step 716 processes the text data for the first page to convert it into the PDF format. Step 718 executes by generating the first page PDF file, shown as PDF 112A above.

Although the first page PDF file may not have the size of subsequent PDF files representing a plurality of pages, it is important to process separately so that any objects are identified and cached. This action breaks the dependencies between the PDF files. A reference library may be avoided or deleted from the PDF files. The PDF files may be processed separately as a result.

FIG. 8 depicts a flowchart 800 for processing the PDF files at PDF interpreter 114 according to the disclosed embodiments. Step 802 executes by receiving the PDF file from printer driver 112. Step 804 executes by processing the data stream using data stream processor 520 of PDF interpreter 114. Data stream processor 520 looks at the PDF data within the file to identify a divider string 402.

Step 806 executes by determining whether the data being monitored includes a divider string 402. The divider string may have a specified format, such as "% PDF" to indicate that the data should be separated for processing separately from subsequent data. If step 806 is yes, then step 808 executes by separating the processed data into a partial data file by internal job separator 522. Step 810 executes by outputting the partial data file for further processing.

If step 806 is no, then step 812 executes by determining whether an end of file string is detected. PDF interpreter 114 does not want to process data belonging to another document so the last PDF file should be identified and sent for processing. If step 812 is no, then flowchart 800 returns to step 804 to keep processing the data stream to identify any divider strings.

For a PDF file generated by printer driver 112, the partial file is provided for processing. Once the data is processed for the PDF file, step 816 executes by sending it to RIP firmware 290 within MFP 104. Subsequent operations are performed in step 818 to print the file as part of printed document 102 corresponding to document 110 received for direct printing on MFP 104.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non- exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more MFP systems coupled to a network capable of exchanging information and data. Various functions and components of the MFP system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

What is claimed is:

1. A method for printing a document having a portable document format (PDF) from a computing device to a printing device over a network, wherein the computing device executes a software application, the method comprising:
   receiving a document created by the software application at a printer driver executing on the computing device;
   converting a first page of the document to the PDF format by the printer driver;
   generating a first PDF file for only the first page of the document;
   determining a page size value based on a parameter corresponding to a storage capacity of the printing device;
   converting a first group of pages of the document including a second page of the document to a final page of the first group to the PDF format, wherein the final page corresponds to the page size value to cause separation of the first group; and
   generating a second PDF file for the first group of pages.

2. The method of claim 1, further comprising
   converting a second group of pages of the document including a page after the final page of the first group of pages to a final page from the second group to the PDF format, wherein the final page of the second group corresponds to the page size value to cause separation of the second group; and
   generating a third PDF file for the second group of pages.

3. The method of claim 1, further comprising
   identifying at least one common item or graphic within the first page; and
   caching the at least one common item or graphic in a memory.

4. The method of claim 3, further comprising processing the at least one common item or graphic with the first group of pages by retrieving it from the memory.

5. The method of claim 1, further comprising determining the final page of the first group of pages and inserting a divider string thereafter.

6. The method of claim 1, further comprising combining the first PDF file and the second PDF file into an output PDF file.

7. The method of claim 6, further comprising receiving the output PDF file at a PDF interpreter on the printing device, wherein the PDF interpreter separates the output PDF into the first PDF file and the second PDF file.

8. The method of claim 7, further comprising determining the first PDF file from the second PDF file using a divider string.

9. A method for printing a document having a portable document format (PDF) from a computing device to a printing device over a network, wherein the computing device executes a software application, the method comprising:
   receiving a document created by the software application at a printer driver executing on the computing device;

converting a first page of the document to the PDF format by the printer driver;

generating a first PDF file for only the first page of the document;

determining a page size value based on a parameter corresponding to a storage capacity of the computing device;

converting a first group of pages of the document including a second page of the document to a final page of the first group to the PDF format, wherein the final page corresponds to the page size value to cause separation of the first group; and generating a second PDF file for the first group of pages.

10. The method of claim 9, further comprising converting a second group of pages of the document including a page after the final page of the first group of pages to a final page from the second group to the PDF format, wherein the final page of the second group corresponds to the page size value to cause separation of the second group; and generating a third PDF file for the second group of pages.

11. The method of claim 9, further comprising identifying at least one common item or graphic within the first page; and caching the at least one common item or graphic in a memory.

12. The method of claim 11, further comprising processing the at least one common item or graphic with the first group of pages by retrieving it from the memory.

* * * * *